Jan. 25, 1955
C. AREND
2,700,555
PINTLE TYPE VEHICLE COUPLING
Filed April 7, 1954
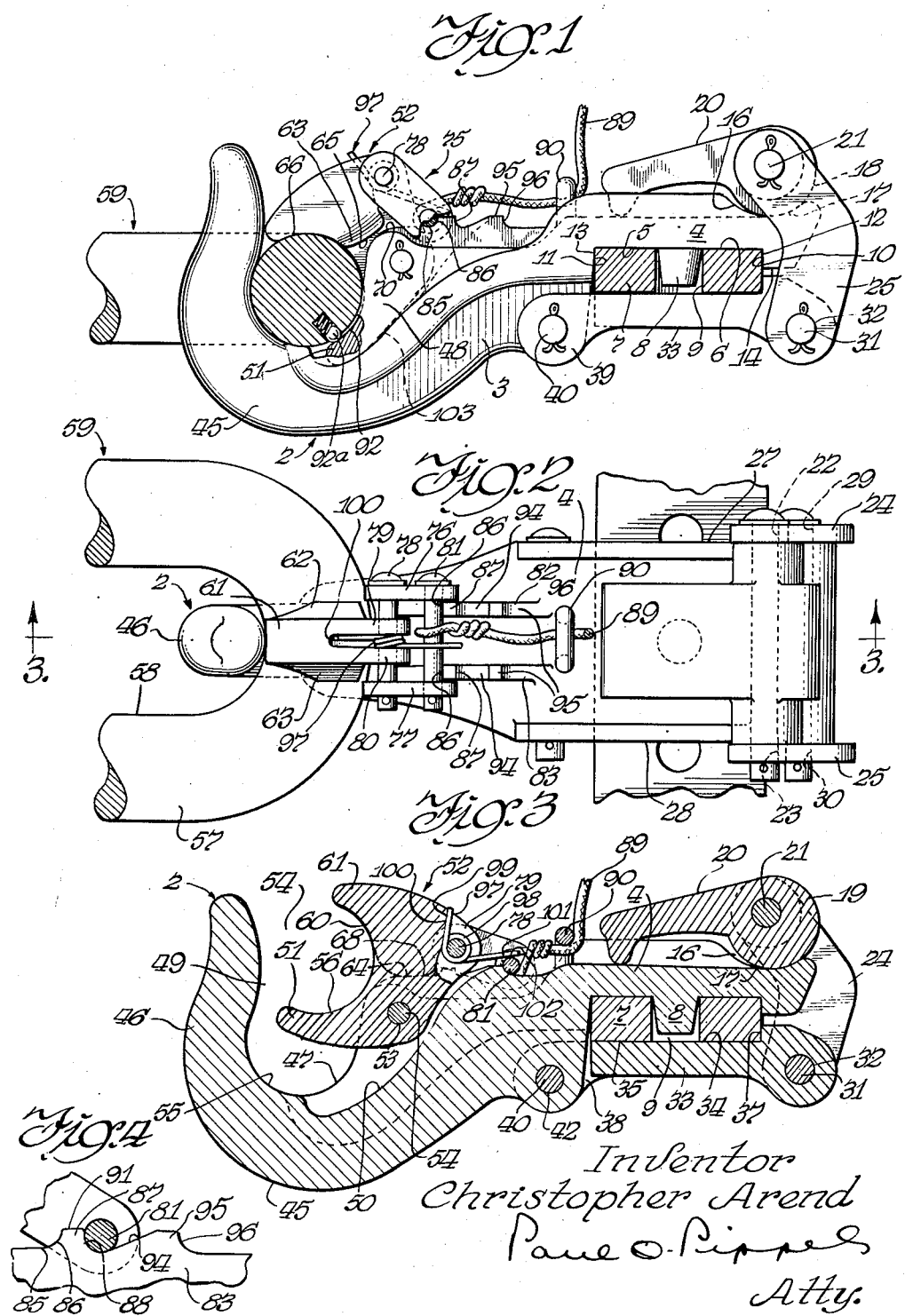
Inventor
Christopher Arend
Paul O. Pippel
Atty.

United States Patent Office 2,700,555
Patented Jan. 25, 1955

2,700,555

PINTLE TYPE VEHICLE COUPLING

Christopher Arend, Berwyn, Ill., assignor to International Harvester Company, a corporation of New Jersey Application April 7, 1954, Serial No. 421,660

9 Claims. (Cl. 280—504)

This invention relates to a coupling arrangement for tractor-trailer combinations, and more particularly to a novel and improved hook coupling of the type incorporating a hook coupler carried by the tractor and cooperative with an eye on the drawbar of the towed vehicle.

A general object of the invention is to provide a novel hook coupler adapted for easy assembly and disassembly with respect to an associated tractor drawbar and which comprises a knuckle arranged to operate across the throat of the hook whereby securely latching the eye of the associated vehicle.

A more specific object of the invention is to devise in the hook coupling above described a novel latching mechanism for the knuckle, such as will hold the knuckle in open position attendant to unlocking the knuckle and separation of the eye from the hook, and which will further automatically lock the knuckle in closed position about the eye of the towed vehicle upon the same being coupled.

A further object of the invention is to provide a knuckle-latch mechanism which may be conveniently operated from the seat of the tractor through a simple cable arrangement.

These and other objects of the invention will become more apparent from the specification and the drawings, wherein:

Figure 1 is a side-elevational view of the novel hook coupling shown in association with an eye of the towed vehicle, said eye being shown in vertical cross section, and the hook coupler being shown applied to a tractor drawbar which is also shown in vertical cross section;

Figure 2 is a plan view of the combination hook coupler and eye shown in Figure 1;

Figure 3 is a longitudinal sectional view taken substantially on the line 3—3 of Figure 2; and Figure 4 is an enlarged fragmentary side-elevational view of the locking and holding lug structure with the latch mechanism fragmentarily shown in vertical section.

Describing the invention in detail, the hook coupler, generally designated 2, comprises a generally horizontal shank portion 3 which at one end is laterally widened and merges into an integral mounting-plate portion 4 which extends generally horizontally and is provided on its bottom side with a flat seating surface 5 which seats, as at 6, on the top side of the transverse drawbar 7 of an associated tractor and which forms part of a hitch arrangement which is shown in a co-pending application of John R. Orelind, Serial No. 338, 651, filed February 25, 1953, for Tractor Attaching Structure, or Russell R. Poynor application, Serial No. 291,245, filed June 2, 1952, for Implement Attaching Structure, these applications along with this application having common ownership. The underside 5 is provided with a single depending boss 8 which is adapted to register and fit into a selected aperture 9 in the drawbar 7. This boss 8 and the associated opening 9 thus locate the coupling and hold it against lateral displacement. The mounting-plate portion 4 is flanked fore and aft by dependent shoulders 10 and 11 (Figure 1), which complementally fit against substantially vertical front and rear edges 12 and 13, respectively, on the drawbar 7 which is of substantially rectangular cross section, as best seen in Figures 1 and 3. The surface or shoulder 11 is formed at the base end of the hook portion shank 3, and the shoulder 10 is formed on the interior side of a dependent lug 14 on the edge of the plate portion 4 remote from the hook 2.

The top side of the plate portion 4 above the lug 14 is provided with an arcuate recess 16 which provides a bearing surface, as at 17, for the cam profile 18 of an over-center cam portion 19 of a latch member 20 which is pivoted at its cam portion 19 on a pin 21 which extends generally horizontally and at its opposite ends is pivotally connected to the upper ends, as at 22 and 23, respectively, of the upright links 24 and 25 which flank the opposite edges 27 and 28 of the plate portion 4 and extend downwardly therebelow in front of the forward edge 12 of the drawbar 7. The lower ends of the links 24 and 25 are pivotally connected, as at 29 and 30, respectively, on a pin 31 which pivots, as at 32, to one end of an underplate 33, which plate 33 extends between the lower ends of the links 24 and 25 and beneath the drawbar 7, and is provided with an upper flat face 34 (Figure 3) for complementary seating engagement with the underface 35 of the drawbar. The plate 33 is provided at one end with an upwardly extending shoulder 37 which engages the edge 12 of the drawbar. The plate 33 is provided at its opposite end with a pair of laterally spaced ears 38 and 39 which are pivotally mounted on a pin 40, said pin 40 being pivotally connected through an aperture, as at 42, to the adjacent end of the shank portion 3. It will be apparent that in order to remove the hook from the drawbar, the latch member 20 is rotated upwardly about the pivot 21 until the cam face 17 is disengaged on the surface 16, and then the members 20, 24, and 25 are bodily pivoted about the pin 31 and simultaneously with the bottom plate portion 33 about the pin 42 under the drawbar 7, whereupon the hook is bodily elevated, thereby withdrawing the boss 8 from the opening 9 and thus is entirely freed from the drawbar. In order to reclamp the hook to the drawbar, the plate portion 4 is seated on the drawbar and the boss 8 entered into the selected opening 9 and then the assembly 33, 24, 25, and 20 is rotated around the underside of the drawbar and disposed in the position shown in Figures 1 and 3 of the drawings. The clamp member 20 is rotated downwardly after the profile 18 is entered into the recess in order to tighten the connection and hold the portions 4 and 33 in tight embracement with the drawbar 7 therebetween.

The shank portion of the hook 2 merges into a bight portion 45 of the hook 2, and this bight portion 45 at its end remote from the flank portion merges into the lower end of an upstanding upwardly tapered pintle portion 46 which, together with a pair of laterally spaced upwardly extending ears 47 and 48 which are formed integral with the top side of the shank portion of the hook along a part thereof opposite the pintle portion 46 and form the back side of the hook and define an upwardly open throat 49 of the hook. The ears or lugs 47 and 48 provide an upwardly open pocket 50 therebetween which is recessed into the bight and shank portions, said pocket receiving the lower thrower portion 51 on the lower end of a C-shaped latch or knuckle, generally designated 52, said knuckle 52 being pivoted intermediate its ends, as at 53, by means of a generally horizontal pin 54 which extends through the member 52 and at opposite ends through registering openings in the ears 47 and 48. The thrower portion 51 projects in the open position of the hook into the throat 49 intermediate its open upper end 54 and the bottom of the throat 55 which is the upper edge of the bight portion 45, and on its upper side said thrower portion 51 presents an eye-engaging face 56 which is of arcuate contour substantially complementary to the contour of the periphery 57 of the eye 58 of a draft member, generally designated 59, which may form part of a towed vehicle, such as a tongue or the like. The surface 56 extends upwardly and merges into a buffing face 60 on the guard-arm or latch portion 61 of the knuckle 52. The buffing face 60 is laterally widened and continued on adjacent edges of laterally outwardly extending stop or abutment lugs 62 and 63 on opposite sides of the guard-arm portion 61 of the C-shaped latch member 52 and provide a broad bearing area for engagement with the top side 66 of the eye 58 and thereby reduce wear. It will be seen from a consideration of Figure 1 that the lugs 62 and 63 are disposed at a level above the upper edges of the ears, and that these lugs 62 and 63 present bottom abutment faces 64 and 65 which are adapted for abutment with the upper edges 68 and 70 at the upper ends of the ears 47 and 48, respectively, in the open position of the knuckle 52 in order to limit counterclockwise or opening rotation of the knuckle, as seen in Figure 3; so that when the eye 58 is entered through the opening 54, as seen in Figure 3, and if it should buff against the surface 60, the latching mechanism will not be damaged.

The knuckle 52 is held in locked position, as shown in Figures 1 and 2, or in open position, as shown in Figure 3, by means of a keeper or lock-to-the-lock assembly, generally designated 75, said assembly comprising a pair of laterally spaced link members 76 and 77 which have upper ends pivoted by a pin 78 on an axis generally parallel to the axis of the pin 53, the pin 78 passing through registering openings in a pair of outstanding ears 79 and 80 on the back side of the guard portion 61 of the knuckle. The axis of pivot of the pin 78 is above the axis of pivot of the pin 53, and the links 76 and 77 extend downwardly diagonally from the pivot 78, and at their lower ends are interconnected by a crossbar or member 81 which extends transversely of and straddles longitudinally extending laterally spaced upstanding ribs 82 and 83 which are formed as continuations of the ears 47 and 48, respectively. The bar 81, in the closed position of the knuckle, is seated adjacent to each end, as at 85, Figure 1, against opposing seats 86 on abutment or locking lugs 87 upstanding from the ribs 82 and 83, and the seating surfaces 86 being located within the circle defined from the axis of pivot of the knuckle 52 on the pin 53 and having a radius equal to the distance between the axes of pivot of the pins 53 and 78. It will be seen that the abutment face 86 is arcuate to form a locking seat for the integral pin 81, and that the face slopes upwardly and away from the knuckle 52. The locking face 86 is on the front side of the boss 87, as respects the knuckle, and the lug 87 has a back side or edge 88 providing an intermediate latch-hold surface engaged by the cross member 81 of the locking latch attendant to an operator pulling on the cord or cable 89 which has one end tied to the cross member 81 intermediate the lugs 82 and 83, said cable being passed through an eye 90 formed integral with the top side of the plate portion 4 and the opening of the eye being at an elevation above the upper edge 91 of the ramp member 87 whereby the operator upon pulling the cord when the mechanism is in the locked position shown in Figure 1, the latch mechanism 75 is caused to swing upwardly about the pivot 78 and thereby elevating the cross member 81 above the upper edge 91 of the ramp member 87 whereby with continued pull, the entire knuckle assembly 52 is caused to rotate upwardly within the limits of the spacing, designated at 92 in Figure 1, between the face 56 of the throat portion 51 of the knuckle and the opposed peripheral surface portion of the eye and against the spring-pressed ball 92a in the eye, the eye in its lowermost position bearing on the surface 55 which is formed on the bight portion and continued on the upper edges of the ears 47 and 48. The spacing at 92 is sufficient to permit the knuckle to rotate to a position whereat the pin 81 overrides the ramps 87 and is entered therebehind on the surface 88 in the hold-for-opening position of the knuckle, as best seen in Figure 4. The seat 88 is continued into an upwardly and rearwardly inclined edge surface 94 which extends to the upper edge of an open-hold lug 95 which on its back edge provides a releasable locking surface 96 against which the cross member 81 is adapted to seat. The latch mechanism is continuously biased in a direction urging the crossbar 81 tightly against the upper edges of the ribs 82 and 83 by means of a torsion spring 97 which has a coil portion 98 pivoted about the pin 78 and one end of the spring has a leg 99 bearing against an opposed bearing surface 100 on the back side of the guard-arm portion 61 of the knuckle, and the spring has its opposite leg 101 bearing, as at 102, against the top side of the cross member 81. It will be observed that the spring serves in the added function in the locked position of knuckle, as shown in Figure 1, in continuously biasing the knuckle in a direction engaging a surface 60 of the guard arm with the top side 66 of the periphery of the eye 59, and this is permitted by the spacing at 103 between the underside of the throw portion 51 of the knuckle and the bottom of the recess 50. This feature reduces wear and maintains the parts slack-free.

Operation of the device

In operation, assuming that the parts are in the position shown in Figure 1, if the operator should desire to uncouple the eye 59 from the hook, he would merely pull upwardly on the cable 89 and thereby raise the latch mechanism 75 out of locking engagement with the seat 86 and continued pulling on the cable 89 would cause the entire knuckle assembly 52 to pivot in a clockwise direction attendant to inward movement of the spring-pressed ball assembly 92a, as seen in Figure 1, to a position disposing a transverse member 81 over the socket defined by the surface 88 between the locking lug 91 and the hold-open lug 95. Release of the cable at this time enters the bar 81 into socket 88, as seen in Figure 4. In the present instance, inasmuch as the hook is adapted to be used with the hydraulically operated hitching linkage, the hook would be lowered whereupon the eye would tend to continue rotation of the knuckle attendant to the bar 81 riding up on the surfaces 94 until the knuckle is swung open to the position shown in Figure 3, whereat the crossbar 81 is seated behind the lug 95 and the knuckle is held in open position upon the eye being withdrawn. In order to couple the parts from the position, as shown in Figure 3, the eye is entered through the open throat portion 54 and the hook raised or the eye lowered in order to trip the knuckle with the bottom edge of the eye engaged with the throw portion 51 of the knuckle whereupon the releasable hold between the holding lug and the cross member 81 is released simply by the cross member 81 sliding up over the top of the lug 95 and then over the lug 87 to the locked position with the surface 86. The ball assembly 92a depresses the knuckle sufficiently to insure locking. The ball 92a may be dispensed with and the spacing 92 eliminated, and the operator may hold the cable until at least the eye is partially elevated to permit the latch to position in the hold-for-opening position.

I claim:
1. In a coupler, a hook member having an upstanding pintle portion, a bight portion and a shank portion defining a throat having an open upper end, a latch C-shaped in side elevation pivoted on a substantially horizontal axis on said shank portion and having a lower thrower portion and an upper guard portion, said latch having a back side facing away from the throat, said latch rotatable to a closed position disposing said guard portion across said upper open end of said throat and to open position with said guard portion moved out of said throat and said thrower portion extended into said throat intermediate its upper and lower ends, a lock-to-the-lock mechanism operatively associated with said latch and comprising link means having an upper end pivoted to the guard portion on an axis generally parallel to the axis of rotation of the latch member and having a lower end with a transverse bar, upstanding locking lug means integral with said shank portion presenting a locking seat facing toward said back side of said latch and engageable with said bar in the locked position of said latch, means for disengaging said lock-to-the-lock from said locking lug and comprising an eye on said shank portion spaced away from said hook and a cable connected at one end to said bar and extending therefrom in a direction toward and passing through said eye at an angle developing a lifting component on said latch attendant to an operator's pulling said cable, and spring means reactively stressed between said latch and said lock-to-the-lock for constantly biasing said lock-to-the-lock in a direction toward said shank.

2. The invention according to claim 1, and further characterized by said locking lug means presenting a hold-for-opening seat facing away from said hook and in position to engage said bar.

3. The invention according to claim 1, and further characterized by said locking lug means presenting a hold-for-opening seat facing away from said hook and in position to engage said bar, and diagonal ramp means extending upwardly and away from said holding lug means and said hook and providing a guide surface, said bar straddling said guide surface, and hold-open lug means formed as a continuation of said ramp means and presenting a releasable seating surface in the path of travel of said bar for releasable engagement with said bar in the open position of said latch.

4. The invention according to claim 1, and further characterized by said locking lug means presenting a hold-for-opening seat facing away from said hook and in position to engage said bar, and diagonal ramp means extending upwardly and away from said holding lug means and said hook and providing a guide surface, said bar straddling said guide surface, and hold-open lug means formed as a continuation of said ramp means and presenting a releasable seating surface in the path of travel of said bar for releasable engagement with said bar in the open position of said latch, and said hook having a recess in said bight and shank portions accommodating said thrower portion therein and of a depth greater than the depth of the thrower portion, and a draft member entrable in said throat and having a yieldable portion alignable with said thrower portion and extensible in a direction urging said thrower portion into said recess in a direction tightly engaging said guard portion with said member.

5. The invention according to claim 1, and further characterized by said locking lug means presenting a hold-for-opening seat facing away from said hook and in position to engage said bar, and diagonal ramp means extending upwardly and away from said holding lug means and said hook and providing a guide surface, said bar straddling said guide surface, and hold-open lug means formed as a continuation of said ramp means and presenting a releasable seating surface in the path of travel of said bar for releasable engagement with said bar in the open position of said latch, and said guard portion having an eye-engaging bearing edge and laterally extending buffing lugs on the guard portion presenting bearing faces in lateral extension of said edge, and said shank presenting upwardly facing abutment surfaces at opposite sides of said latch and said lugs having stop surfaces engageable with said abutment surfaces for limiting rotation of said latch to said open position thereof.

6. In a coupling, a hook having an upstanding pintle portion forming the front side of the hook, a bottom bight portion, and a shank forming a back-side portion of the hook and having an attachment extension for the hook projecting therefrom, said hook having an upwardly open throat, said back-side portion having a pair of upstanding integral laterally spaced ears thereon, a latch C-shaped in side elevation disposed between and pivoted intermediate its ends on a generally horizontal axis to said ears and providing a thrower below said axis and a guard portion above said axis, said latch rotatable to open position with said thrower portion extending into said throat and said guard portion swinging away from said pintle portion with the upper end of said throat open and said latch rotatable to closed position with said thrower portion withdrawn between said ears and said guard portion extending from said back-side portion to said pintle portion across said throat in closing position to its upper end, and a lock-to-the-lock having a pair of links with upper ends flanking said guard portion, a pin pivotally connecting said upper ends to said guard portion on an axis generally parallel to said first-mentioned axis, said links extending diagonally downwardly and away from said guard portion, a crossbar interconnecting the lower ends of said links in straddling position to said extension, a torsion spring looped about said pin and having one leg bearing against said guard portion and having another leg bearing upon said crossbar in biasing relation to said latch, urging it to closing position and said lock-to-the-lock downwardly with the crossbar against said extension, and releasable locking means on said extension cooperatively associated with said crossbar for selectively holding said latch in locked or unlocked positions.

7. The combination according to claim 6, and said releasable locking means comprising a pair of longitudinal ribs on said extension integral with respective ears, and a locking lug and a holding lug on each rib spaced longitudinally thereof and each locking lug presenting a locking surface facing said latch in cooperative position with said crossbar and each holding lug presenting a surface facing away from the latch in position for releasable engagement with said crossbar for holding said latch in open position.

8. The combination according to claim 6, and said releasable locking means comprising a pair of longitudinal ribs on said extension integral with respective ears, and a locking lug and a holding lug on each rib spaced longitudinally thereof and each locking lug presenting a locking surface facing said latch in cooperative position with said crossbar and each holding lug presenting a surface facing away from the latch in position for releasable engagement with said crossbar for holding said latch in open position, and a diagonal ramp surface between each holding and each locking lug and sloping downwardly from the former to the latter, and each locking lug presenting a hold-for-opening surface facing away from the latch and merging into the adjacent end of the associated ramp surface.

9. In a coupler arrangement, a hook having an open end, a shank connected to the hook, a latch pivoted to the hook and having a first portion extending across said open end in closing relation thereto in the locking position thereof and positioned at one side of said opening in the open position thereof, means cooperative with said latch and said shank for selectively holding said latch in open or closed position, and means for mounting said coupler on an associated vehicle drawbar comprising a top plate connected to the shank and having a dependent boss for reception in a selected opening in the drawbar, a bottom plate having one end pivoted to said shank, link means having one of the ends thereof pivoted to the other end of said bottom plate and disposed in position to extend along one edge of the drawbar, said shank having an abutment face positionable against the opposite edge of said drawbar, and an over-center clamp pivoted to said link means and overlaying said top plate and having a cam portion, and said top plate having a seat receiving said cam portion.

References Cited in the file of this patent

UNITED STATES PATENTS

| 1,832,042 | Mohr | Nov. 17, 1931 |
| 2,426,532 | Tierney | Aug. 26, 1947 |
| 2,431,694 | Johnson | Dec. 2, 1947 |

FOREIGN PATENTS

| 4,946 | Great Britain | Nov. 11, 1881 |